United States Patent Office 2,701,398
Patented Feb. 8, 1955

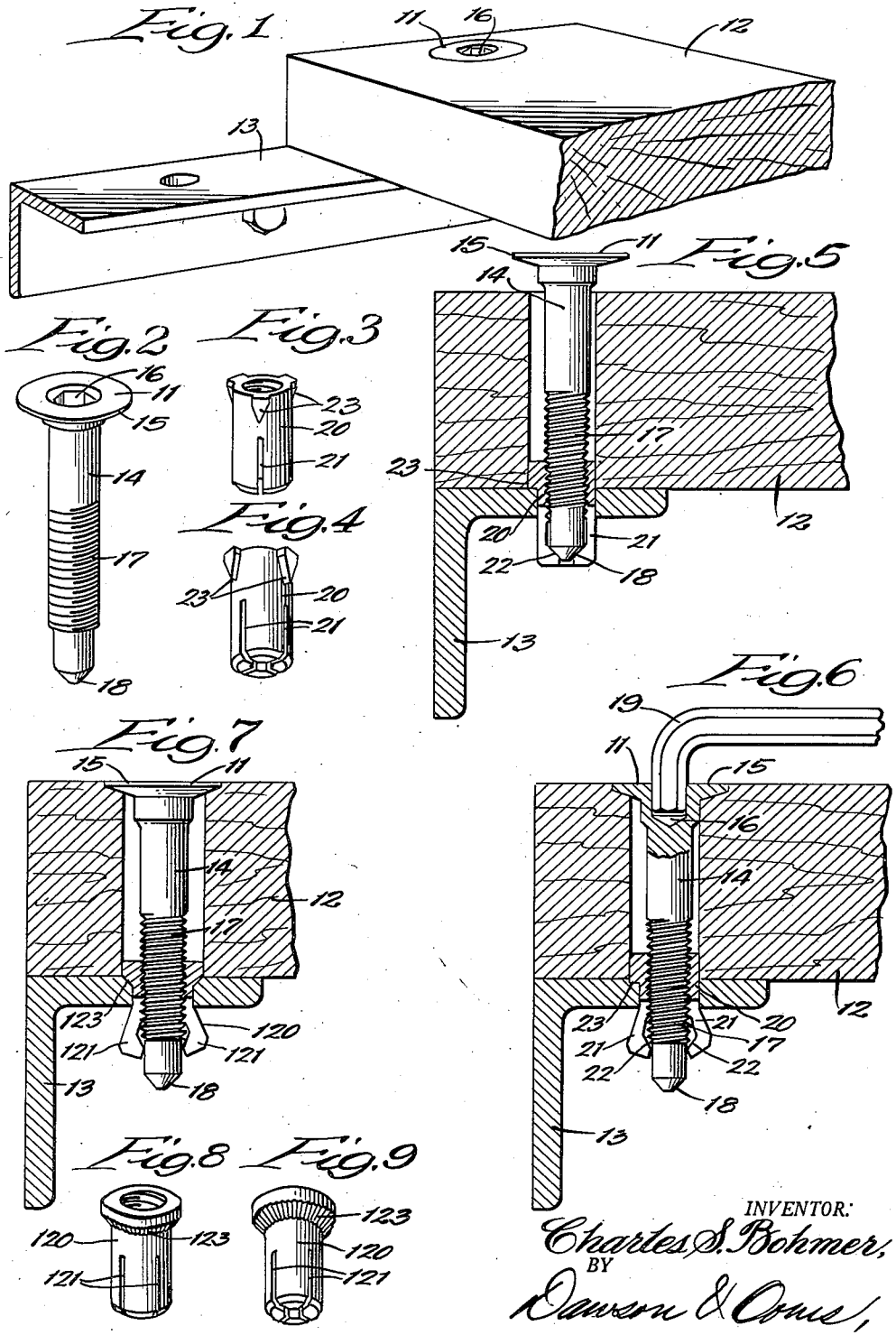

2,701,398

THREADED FASTENING DEVICE

Charles S. Bohmer, Chicago, Ill., assignor to Square Tool & Die Co., Inc., Chicago, Ill.

Application September 12, 1950, Serial No. 184,421

1 Claim. (Cl. 20—92)

This invention relates to fastening devices of the general class of bolts and nuts, and has for its purpose the provision of a simple fastening device which can be operated in "blind" locations where the female member of the fastening device is not accessible for engagement by a tool. A common instance of this problem is in the securing of floor planking to the interior of a boxcar where the fastening devices must penetrate the flooring and the underlying frame and the inaccessible female member of the fastener must be held against rotation while the male member is rotated to its final position.

A preferred embodiment of the structure incorporating this invention is shown in the accompanying drawings in which:

Figure 1 illustrates a fastening member 11 of this invention securing a plank 12 to a frame member 13;

Figure 2 illustrates the male member of the fastening device;

Figures 3 and 4 are side views in perspective of the female fastening member;

Figure 5 is a view partially in section of the assembly shown in Figure 1;

Figures 6 and 7 are other views partially in section of the assembly shown in Figures 1 and 5 with the wrench (Fig. 6) in engagement with the male fastening member and the female member in its final position of assembly;

Figures 8 and 9 show a modified form of the female fastening member.

Referring to the drawings, the male member of the fastening device comprises a bolt-like member with a shank 14 surmounted by a head 15 with a suitable socket 16 for engagement with a rotating tool. The lower end of the shank 14 is threaded 17 in the conventional manner and may terminate in a tapered end 18. The female member in the form shown in Figures 3 and 4 comprises an annular body or cylindrical member 20 which is bored through most of its length and partially closed at the lower end with an end wall which has sloping walls 22 tapering toward the center of the bore. The annular body is provided with slots or lines of weakness 21 which cut through the body wall and also through the end wall.

At the open end of the female member a plurality of pointed projections 23 are provided around the exterior of the body with the points or teeth directed toward the other end of the female member.

In the modified form shown in Figures 8 and 9, the teeth 23 shown in Figures 3 and 4 are eliminated and the body 120 is surmounted by an annular flange 123 which extends around the exterior of the annular wall and has a series of serrations on its lower face with the points or teeth pointing toward the other end of the female member.

The fastening member is operated in the following manner: Suitable holes are drilled through the two devices to be secured together (for example 12 and 13) and the bolt or male member 11, with the female member threaded on the end thereof but not sufficiently far to have the bolt distort the end wall of the female member, is dropped or forced through the aligned holes until the teeth 23 or serrations 123 on the female member engage the inner edge of the hole in the frame member 13 so that as the bolt 11 is rotated the female member 20 will be held against rotation.

With the female member held against rotation by engagement of the teeth 23 or serrations 123 with the edge of the hole in the frame member 13, rotation of the bolt 14 by means of a suitable tool such as that indicated by the numeral 19 in Figure 6, forces the threaded shank of the bolt into the female member until the end of the bolt, which may be an ordinary bolt but is shown in the preferred form as tapered at 18 engages the sloping walls 22 of the end wall of the female member. Continued rotation of the bolt when in this position forces the lower end of the walls of the female member outwardly and the lines of weakening slots 21 permit the spreading of these portions of the female member until they form a greatly enlarged body which prevents retraction of the bolt through the hole through which it was inserted.

The force necessary to accomplish this distortion of the walls of the female member also effects some distortion of the threads 17 on the bolt member with a result that the assembly when completed has little tendency to loosen, and the device thus serves the additional function of locking the male and female members together against the backward rotation which would loosen the assembly.

It is obvious that the male and female members may be made in different sizes and in different proportions according to the uses to which they are to be applied, and also that the female member 20 may be used with ordinary bolts, although the force required for installation when ordinary bolts are used, is slightly greater than that required for the preferred embodiment shown herein.

Having thus described the invention and the preferred embodiment thereof and without limitation to the details and specific forms illustrated therein except as defined in the following claim.

I hereby claim:

In combination, a wooden or soft facing and a metal plate backing, each having at least one hole extending therethrough, the holes being in register, a driven connecting means inserted from the facing through the registering holes and extending beyond the backing, the connecting means comprising a bolt having at one end a head and adjacent its other end a plurality of serrations; and a tubular sleeve through which said bolt extends, the sleeve filling an interval between the bolt and the walls of the hole in the facing, said sleeve including external rib means engaging the wall of the hole in the soft facing holding the sleeve against rotation and engaging the face of said metal backing adjacent the facing and limiting movement of the sleeve through said metal backing, the sleeve including a plurality of flexible fingers extending through and beyond the metal backing plate, the fingers having inturned end portions which are spread out by the lower end of the driven connecting means, inhibiting withdrawal of the sleeve through the backing plate, the serrations on said driven connecting means being held in a fixed position by means on said tubular sleeve, the length of the sleeve exclusive of the flexible fingers being less than the thickness of the facing.

References Cited in the file of this patent

UNITED STATES PATENTS

| | | |
|---|---|---|
| 2,051,066 | Anderson | Aug. 18, 1936 |
| 2,379,786 | Bugg | July 3, 1945 |
| 2,393,606 | Brush | Jan. 29, 1946 |
| 2,435,876 | DeSwart | Feb. 10, 1948 |

FOREIGN PATENTS

| | | |
|---|---|---|
| 335,508 | Great Britain | Sept. 25, 1930 |
| 425,780 | Great Britain | Mar. 21, 1935 |
| 569,774 | Great Britain | June 7, 1945 |